United States Patent [19]

Farrar

[11] Patent Number: 5,310,774

[45] Date of Patent: May 10, 1994

[54] MOLECULAR WEIGHT DEGRADATION STABILIZED POLYMERIC COMPOSITIONS

[75] Inventor: David Farrar, Bradford, England

[73] Assignee: Allied Colloids Limited, England

[21] Appl. No.: 635,605

[22] PCT Filed: May 18, 1990

[86] PCT No.: PCT/GB90/00772

§ 371 Date: Jan. 22, 1991

§ 102(e) Date: Jan. 22, 1991

[87] PCT Pub. No.: WO90/14387

PCT Pub. Date: Nov. 29, 1990

[30] Foreign Application Priority Data

May 19, 1989 [GB] United Kingdom ............ 8911525.7

[51] Int. Cl.$^5$ .................. C08L 33/26; C08J 3/00
[52] U.S. Cl. .................... 524/535; 528/486; 528/491; 528/492; 525/285; 525/287; 525/291; 525/296
[58] Field of Search ............... 524/535; 525/285, 287, 525/291, 296; 528/492, 491, 497, 498, 486

[56] References Cited

U.S. PATENT DOCUMENTS

| 2,649,434 | 8/1953 | Coover et al. | 525/296 |
| 2,831,841 | 4/1958 | Jones | 528/492 |
| 3,901,857 | 8/1991 | Sackman et al. | 526/287 |
| 4,247,405 | 1/1981 | Wier | 252/8.55 |
| 4,306,048 | 12/1981 | Yoshida et al. | 528/486 |
| 4,559,074 | 12/1985 | Clarke | 525/296 |
| 4,563,290 | 1/1986 | Okada et al. | 526/287 |
| 4,687,807 | 8/1987 | Wetegrove et al. | 528/492 |
| 4,778,836 | 10/1988 | Farrar et al. | 524/35 |
| 4,906,732 | 3/1990 | Farrar et al. | 524/17 |
| 4,929,717 | 5/1990 | Chmelir | 528/492 |
| 4,996,251 | 2/1991 | Farrar et al. | 524/17 |

FOREIGN PATENT DOCUMENTS 0443878 9/1972 U.S.S.R. ............................ 525/296

Primary Examiner—Paul R. Michl
Assistant Examiner—Peter Szekely
Attorney, Agent, or Firm—Ostrolenk, Faber, Gerb & Soffen

[57] ABSTRACT

Polymeric compositions are stabilized against molecular weight degradation by the inclusion in the composition of an inhibitor which is preferably an ethylenically unsaturated compound. The invention is of particular value when the polymer is a polymer of (meth)acrylamide in which the amount of contamination of the polymer with free (meth)acrylamide monomer is extremely low and the inhibitor has LD$_{50}$ above 400.

24 Claims, No Drawings

MOLECULAR WEIGHT DEGRADATION STABILIZED POLYMERIC COMPOSITIONS

This invention relates to water soluble and water swellable polymers of ethylenically unsaturated monomers and their stabilisation so as to reduce molecular weight degradation during storage and use. It also relates to polyacrylamides in which this problem of degradation is particularly significant.

When making a water soluble or swellable polymer from ethylenically unsaturated monomer, it is normal to try to achieve full polymerisation of the monomers but in reality some monomer always remain unpolymerised in the polymeric reaction product. This may be relatively unimportant in the case of some monomers but it is known to be undesirable in the case of methacrylamide or, especially, acrylamide because of the toxicity of this monomer. It is normal practice therefore to conduct acrylamide polymerisation so as to reduce the acrylamide content to as low a value as is conveniently possible, which in practice generally means that the polymer has a residual free acrylamide content of, typically, 0.2 to 0.5%.

Extensive studies have been made of the performance of polymers of ethylenically unsaturated monomers and it is known that they are liable to undergo degradation during storage or use. This degradation is particularly serious for the higher molecular weight polymers, for instance molecular weight above one million. The fact that degradation is occuring is manifested by, for instance, a reduction in the solution viscosity of the polymer. In those circumstances when the polymer is being used as a viscosifier the reduction in viscosity would probably be noticed, but even then this might be put down to other factors, for instance that the polymer as initially made had lower solution viscosity than was expected. Also, it may not be practical to measure solution viscosity during use (e.g. when the polymer is being used downhole). In other situations, e.g. as a flocculant, the solution viscosity of the polymer may not normally be measured and the performance of the polymer may depend upon a whole range of factors of which solution viscosity is only one, and so in theory performance could be put down to any of these factors and, again, may be attributed to inferior properties in the polymer as manufactured initially.

Even when it is observed that solution viscosity has been reduced this reduction could be due to changes in the side groups, for instance, hydrolysis, or could be due to cleavage of the backbone, i.e. reduction of molecular weight, and it can be relatively difficult to prove clearly which effect is occurring.

Despite these uncertainties as to the cause of degradation, there have been numerous proposals to incorporate various degradation inhibitors in polyacrylamides. Examples are given in the following Chemical Abstracts, namely isobutanol, trichlorphenolate and amino acids in volume 108 189657g, phosphonates in volume 106 511875f, N-methyl-2-pyrrolidone in volume 105 229619t, maleic anhydride acylation derivatives of urea, thiourea, phenylurea or ethanolamine in volume 99 140769b, various sulphur compounds such as thiocarbonates in volume 56 52294m, thiourea and polyethylene glycol in volume 91 23783g and various compounds such as napthoquinone in volume 98 108362g. Many of the additives are described as being added to prevent oxidation of the polymer and in Chemical Abstract 88 23892y an inorganic reducing agent is used.

In FR-A-2604444 the viscosity of a polyacrylamide for enchanced oil recovery is stabilised by adding at least 5% acrylamide monomer, base on the polymer. In JP-A-60/210657 it is proposed to stabilise polyacrylamide homopolymers, and copolymers of acrylamide with less than 50% of the monomers, that are to be used for purpose such as flocculation, paper-making, enhanced oil recovery, viscosifiers and soil improvers. This stabilisation is by the addition of at least 0.5% of a water soluble vinyl monomer and in the examples the monomers used are acrylamide (in an amount up to 7%) sodium acrylate, methacrylamide, acrylonitrile, dimethylaminoethyl acrylate and 2-acrylamido-2-methylpropane sulphonic acid (AMPS, U.S. Trade Mark).

Despite all this extensive literature the commercial reality is that a very limited range of additives are incorporated to improve stability. Urea is included for various reasons an can give some improvement. Greater improvement is achieved with thiourea, sodium nitrite or trimethoxyphenol but each of these materials are rather inconvenient to incorporate into the polymer, and the polymer is still liable to undergo substantial viscosity reduction during storage and use, especially at elevated temperatures.

Separate from the stabilization of conventional polyacrylamide, contaminated with, for instance, 0.2% or more free acrylamide, some polyacrylamides contaminated with less free acrylamide have been produced. For instance polymer that is to be used for the purification of potable water generally has a free acrylamide content of around 0.05%. The viscosity of such a polymer is not directly significant for water-purification properties and Iam unaware of any viscosity or other stability studies having being conducted on such polymers.

It is also known to make polyacrylamides having even lower contents of free acrylamide. This can be achieved either by careful optimisation of the polymerisation conditions or by removal of the free acrylamide after polymerisation by washing, chemical reaction or biological means, for instance as described in European Patent Applications 89301185.8 and 89301186.6 or U.S. Pat. No. 4,687,807.

Thus the present industrial situation is that all polyacrylamides having typical levels of acrylamide contamination are liable to undergo viscosity degradation on storage or use under some conditions, the commercially used ways of trying to prevent this degradation are not full satisfactory and incur various disadvantages, methods in the literature also appear unsatisfactory, FR-A-2604444 and JP-A-60/210657 describe the stabilisation of acrylamide polymers by the use of acrylamide or other monomers but toxicity consideratio"s contraindicate the general teachings of these patents (for instance the use of large amounts of acrylamide) and relatively pure polyacrylamides (having a low content of free acrylamide) are even more unstable.

In a first aspect of the invention, I have now found that it is possible to stabilise these relatively pure polyacrylamides against molecular weight degradation and that this can be achieved easily by the incorporation of materials that are easy to incorporate and that do not reintroduce the toxicity problems that had been avoided by the reduction of the content of free acrylamide.

In particular, the first aspect of the invention provides a polymeric composition comprising of blend of a polymer of (meth) acrylamide, free (meth) acrylamide monomer and viscosity-degradation inhibitor, and in the invention the amount of free (meth) acrylamide monomer is below 0.1% by weight of the polymer and the $LD_{50}$ of the inhibitor is above 400.

$LD_{50}$ of the above 400 means that more than 400 mg of the inhibitor is required per kilogram bodyweight to achieve 50% lethality when administered orally to rats.

Thus, relative to conventional commercial polyacrylamide, the product of the invention omits most of the relatively toxic (meth) acrylamide (thereby making the product potentially very susceptible to viscosity degradation) and replaces this monomer by a material that is much less toxic and that does stabilise the polymer against viscosity degradation.

The preferred polymeric compositions have a stability against viscosity degradation at least as good as and preferably better than the same polymer containing 0.2% free (meth) acrylamide.

Despite having this equivalent and, preferably, greatly improved stability the overall toxicity (measured both as $LD_{50}$ and as cumulative toxicity) of the stabilised composition can easily be no greater than polyacrylamide containing 0.2% free (meth) acrylamide and is preferably substantially less. Thus, it is possible, by the invention, for the first time, to provide a polyacrylamide that meets the highest environmental standards as regards free (meth) acrylamide and yet has exceedingly good viscosity stability.

Despite all the discussion in the literature about oxidation inhibitors and side group reactions, it appears that viscosity degradation is primarily due to reduction in molecular chain length, and that this in turn is due to breakage of the polymer backbones by unreacted polymerisation initiators, and degradation products of such initiators, left over from the polymerisation process. In particular the presence of free radical initiators in the final polymer seems to be a particular cause of molecular weight degradation and thus viscosity degradation.

The amount of degradation inhibitor that has to be added, to achieve any particular stability, is therefore reduced if the amount of initiator debris in the polymer is reduced. Preferably therefore the polymerisation is conducted using techniques that result in the lowest possible initiator residues in the final product. For instance, the rate of addition of initiator is preferably controlled so as to minimise initiator residues in the final polymerisation product. If the polymer is substantially free of such residues then the amount of viscosity-degradation inhibitor that has to be added can be relatively low. It is then possible to use any of the degradation inhibitors that are known from the literature and which both function as a free radical sink and which have $LD_{50}$ above 400.

Preferably, however, the inhibitor is an ethylenically unsaturated material that has $LD_{50}$ above 400.

Acrylamide itself ($LD_{50}=124$) is of course excluded from consideration as are other monomers that have similar or worse toxicity values, such as acrylonitrile ($LD_{50}=78$) and acrylic acid ($LD_{50}=250$).

Monomers that can be used include low toxicity ethylenically unsaturated carboxylic acids, for instance maleic acid ($LD_{50}=708$) and fumaric acid ($LD_{50}=10700$) and ethylenically unsaturated cationic monomers, especially dialkyl aminoalkyl (meth) acrylates such as dimethyl aminoethyl (meth) acrylate ($LD_{50}=1751$) and dialkyl aminoalkyl (meth) acrylamides especially those where the central alkylene group contains at least two chain carbon atoms, for instance methyl chloride quatenary salt of dimethyl aminopropyl (meth) acrylamide (Maptac, $LD_{50}=715$). Diallyl dialkyl monomers can be used especially diallyl dimethyl ammonium chloride (Dadmac, $LD_{50}=1700$).

A wide variety of other ethylenically unsaturated monomers are of course well known and potentially useable, for instance, monoallyl triallyl quaternary compounds such as allyl trimethyl ammonium chloride (atmac), other allyl materials such as allyl sulphonate, other anionic materials such as vinyl sulphonate and styrene phosponate, maleic anhydride, fumaric anhydride, dimethyl amino ethyl acrylate and dimethyl amino propyl acrylamide.

The use of monomers containing one or more allyl groups is particularly preferred, especially Dadmac.

The ethylenically unsaturated material does not have to be a monomer and it can instead be a material that contains a polymeric backbone with ethylenic unsaturation either in the backbone, in terminal groups or in pendant groups. The use of a polymer in this manner is particularly desirable since it can contribute to the viscosity or other properties of the polymer that is being stabilised or, at least, minimise the dilution effect on the polymer that might be provided otherwise by the monomer. Preferred polymers are polymers formed from allylic monomer (either alone or with up to 90%, preferably not more than 50%, other ethylenically unsaturated monomer. Preferred allylic monomers are diallyl dialkyl ammonium compounds. The polymers of diallyl dimethyl ammonium chloride (especially the homo polymer) are particularly preferred in this respect. Such polymers are believed to be terminated by free allyl groups.

Other suitable polymers are acrylic terminated polyethylene glycols and other unsaturated polymers including, especially, the prepolymers described in European application 89301075 (EP-A-328321).

It can be acceptable for the ethylenically unsaturated material to undergo polymerisation during the storage or use conditions that would otherwise have caused viscosity degradation, but it is generally preferred that the material merely acts as a free radical sink and does not undergo any substantial chemical change as a result of this. One disadvantage of the monomer being too reactive is that it may tend to react onto the polymer itself and this may alter the performance characteristics of the polymer. In some instances this is undesirable. For instance if the polymer is soluble, it may tend to be insolublised by reaction of a monomer that is too reactive. Amps is a example of a monomer that tends to have too high a reactivity if it is to be used in an environment where some degree of insolubilisation is unacceptable.

The material may be non-ionic or it may be co-ionic or counter-ionic with the polymer. If it is counter-ionic the amount must not be such that the monomer forms an insoluble complex with the polymer. The inhibitor should normally be water soluble so that it can be introduced as an aqueous solution.

The polymer that is to be stabilised in this first aspect of the invention is formed from (meth) acrylamide alone or with other ethylenically unsaturated monomer. When there is a blend of monomers, the blend (and usually each of the monomers in the blend) preferably is water soluble.

The polymer that is to be stabilised is preferably soluble in aqueous liquid, but the invention can also be applied to polymers that are insoluble, for instance as a result of being cross-linked by polyethylenically unsaturated monomer or other suitable crosslinking agent. If it is insoluble, it may be crosslinked to such an extent that it is substantially non-swelling but generally it is relatively lightly crosslinked such that it is swellable and has high absorption capacity, for instance at least 30 grammes de-ionised water per gramme polymer.

The polymer may be a substantial homopolymer of (meth)acrylamide, generally polyacrylamide homopolymer in which event it should be non-ionic. However, it may be anionic as a result of a small degree of hydrolysis of acrylamide groups or as a result of copolymerisation of the (meth)acrylamide with ethylenically unsaturated carboxylic or sulphonic monomer. Suitable monomers are any of the conventional water soluble anionic monomers such as (meth)acrylic acid (generally as a water soluble salt) or AMPS.

The polymer may be cationic, in which event it is co-polymerised with ethylenically unsaturated cationic monomer. Suitable cationic monomers include dialkylaminoalkyl(meth)-acrylates, -methacrylates, -acrylamides, and -methacrylamides (especially when the central alkylene group contains at least 2 chain atoms) and diallyl dialkyl monomers. Preferred examples are any of the cationic monomers mentioned above, in particular dimethyl(or diethyl)aminoethyl(meth)acrylates and dimethyl(or diethyl)aminopropyl(meth)acrylamides, and Dadmac. The (meth)acrylates and (meth)acrylamides will normally be present as acid addition or quaternary salts. The amount of (meth)acrylamide in the monomers from which the polymer is formed may range from 5 to 100% by weight, often 50 to 100%.

The polymer generally has molecular weight above 1 million, often above 5 million. It generally has intrinsic viscosity (measured in 1 molar sodium chloride at 25° C. by suspended level Viscometer) above 4 dl/g. When the polymer is anionic the IV is typically in the range 10 to 30. When the polymer is cationic the IV is typically in the range 6 to 18.

The polymer may be made by polymerisation in conventional manner conducted with careful optimisation so as to produce a residual free acrylamide content of below 0.1% preferably below 0.05% and most preferably below 0.03%. Methods currently used for making polymer for potable water treatment may be utilised. Alternatively the polymer may be synthesised and may then be subjected to washing or other purification, as discussed above, so as to reduce the monomer content.

The invention is of particular value when applied to cationic polymers because it is well known that they tend to suffer significant reduction in viscosity during many of their conventional uses, for instance downhole acidising, fracturing or completion fluids, and the invention provides a significant commerically and toxicologically effective solution to this problem.

The inhibitor can be present throughout the formation of the polymer if it has a sufficiently low reactivity rate that it will not participate in or interfere with the polymerisation reaction. Generally, however, it is added after the polymerisation is completed. If the polymer is present as a fluid solution or emulsion or dispersion (for instance a reverse phase dispersion or emulsion) the inhibitor can conveniently be incorporated into this fluid composition merely by stirring.

A particularily preferred method of blending the inhibitor with a water soluble or water swellable polymer comprises providing the polymer as a dispersion of particles in an non-aqueous liquid (for instance by dispersing chopped gel into oil or, preferably, reverse phase polymerisation) and then mixing the inhibitor into the dispersion, the inhibitor and the non-aqueous liquid being selected such that the inhibitor is preferently soluble in the particles. Preferably the particles in the dispersion are substantially dry before the inhibitor is added. For instance a dispersion may be made by reverse phase polymerisation followed by azeotroping, and inhibitor (generally dissolved in water) may then be mixed into the dispersion.

If the polymer is provided as a solid gel, for instance as beads or comminuted gel particles, the inhibitor, (generally as an aqueous solution) may be imbibed into the particles either before they are dried or after drying (in which event a further drying step maybe necessary).

The inhibitor may serve to prevent or reduce viscosity under substantially any conditions during which such degradation is likely to occur, e.g. upon heating, exposure to ultra violet radiation or daylight, dilution waters or other liquors that contain impurities (e.g. ferrous iron) that cause viscosity degradation, or prolonged storage. The inhibitor may serve to prevent or reduce viscosity degradation in any type of composition e.g. a dry product such as bead or comminuted gel, a reverse phase dispersion, or a solution, for instance flocculant solution between initial makeup and use as a flocculant.

The compositions of the invention can be used for a wide variety of purposes, depending on the particular polymer. For instance such uses can be selected from viscofication, enhanced oil recovery, flocculation, paper making, soil improvers, wallpaper and other adhesives, water shut-off and soil stabilisation and grouting, absorbents and soforth.

It is of particular value when the polymer is to be subjected to heating, hot and/or chemically aggressive conditions, e.g. as flocculant for Bayer process liquors.

The polymer can be used in various downhole environments. For instance the polymer may be a high molecular weight anionic polymer for enhanced oil recovery. However, the inventions is of particular value in hot aggressive downhole environments, as described in PCT application GB/90,100,773 filed today by the same applicant and inventor. Thus it may be a high molecular weight anionic polymer (generally cross-linkable) for downhole fracturing uses, a high molecular weight anionic or cationic polymer for downhole acidising, a medium to high molecular weight cationic polymer for downhole completion fluids, or a medium molecular weight anionic polymer as a fluid loss additive in drilling fluids.

The polymer may be one that is to be reacted, at its pendent groups, at elevated temperature after its formation and the inhibitor minimises degradation during reaction. For instance polyacrylamide can be hydrolysed by heating in aqueous alkali and degradation during the hydrolysis can be minimised in the invention.

The polymer may be exposed for prolonged periods to an electrolyte, for instance as in a textile printing paste. The polymer may be exposed for long periods to ultraviolet radiation, for instance as an agricultural polymer for enchancement of soil structure. The polymer may be exposed to high temperatures for a short period, for instance it may be a wall paper prepaste adhesive and molecular weight degradation during hot embossing or foaming stages of the wallpaper can be minimised by the presence of the inhibitor of the invention.

The amount of inhibitor that has to be added will be found by trial and experiment. It usually at least 0.05% and generally at least 0.1%. Since the inhibitor may tend to dilute the activity of the polymer it is generally preferred that the amount should be below 20%, preferably below 10% and most preferably below 5% by weight of the polymer.

However, when a dilution effect does not create a problem or is even desirable (for instance when the inhibitor is a polymer, or during storage forms of polymer, that complements the properties of the polymer that is to be stabilised) then larger amounts may be used, e.g. up to 50% by weight.

Some of the discoveries on which the first aspect of the invention are based are applicable also to other compositions, for instance to compositions where the monomers from which the polymer is made are free of (meth)acrylamide and/or to polyacrylamides that are contaminated with up to, for instance, 0.5% or even 1% by weight free (meth)acrylamide monomer. The invention therefore includes also other aspects which are applicable to such polymers, as well as to the polymers defined in the first aspect of the invention.

A second aspect of the invention resides in effective ways of incorporating the inhibitor with the polymer that is to be stabilised. In JP-A-60/210657 and FR-A-2604444 the inhibitor is added to a solution of the polymer, but this renders the inhibition technique inapplicable to solving the problem of storage stability of dry polymers or suspension polymers, and these are the forms in which such polymers are most usually supplied commercially. I have surprisingly found that the inhibitor can be added to the polymer while in the form of a gel, a powder or a dispersion in water immiscible liquid. Suitable methods are described above.

The only proposals in the literature for the use of monomers of the type discussed above (JP 60210657 and FR 2604444) relate to the stabilisation of acrylamide polymers. In a third aspect of the invention, I have surprisingly found that it is possible to stabilise, in a similar manner, polymers made from monomers that are entirely free of (meth)acrylamide. Thus, it is now possible to stabilise polymers in which 100% of the monomers are anionic or cationic. Suitable anionic and cationic monomers are those listed above for incorporation in the acrylamide polymers of the first aspect of invention. Copolymers of them with other non-ionic monomers, for instance vinyl acetamide, N-vinyl-N-methyl acetamide, N,N-dimethylacrylamide or vinyl pyrrolidone can be used.

Preferably the polymers are formed from monomers selected from AMPS or, preferably, dialkylaminoalkyl methacrylates or dialkylaminoalkyl (meth)acrylamides where the central alkylene group contains at least 2 carbon atoms, as discussed above.

As indicated above, preferred results are achieved when the stabilising monomer is allylic, either an allylic monomer or a polymer made from monomer comprising allylic monomer, and according to a fourth aspect of the invention any of the polymers discussed above are stabilised by the use, as inhibitor, of an allylic monomer or polymer, preferably Dadmac.

In a fifth aspect of the invention, any of the polymers discussed above are stabilised by the addition of a polymer that includes ethylenic unsaturation, for instance, the allylic polymers or other ethylenically unsaturated polymers mentioned above.

In the second and third aspects of the inventions, the inhibiting ethylenically unsaturated monomer is preferably one of those discussed above for use in the first aspect of the invention but can, alternatively, be other monomers such as acrylamide itself, acrylonitrile or acrylic acid. The products of these second to fifth aspects of the invention may otherwise be formulated using the same materials, and for the same purposes as are discussed above for the first aspect of the invention.

EXAMPLE 1

The viscosity (Brookfield RTV, spindle 1 to 20 rpm) of a polymer solution aged at 150° C. for various times and the same solution to which 1,000 ppm DADMAC had been added was measured. The aging time and viscosity results are shown below.

| | Blank | | Dadmac | |
|---|---|---|---|---|
| | Viscosity (CP) | % Retained | Viscosity (CP) | % Retained |
| Initial | 113 | — | 86 | — |
| 1 hour @ 150° C. | 116 | 102.7% | 104 | 120.9% |
| 2 hours @ 150° C. | 86 | 76.1% | 98.5 | 114.5% |
| 4 hours @ 150° C. | 66 | 58.4% | 84 | 97.7% |
| 16 hours @ 150° C. | 47.5 | 42.0% | 86.5 | 100.6% |

EXAMPLE 2

When the process of example 1 was repeated using the co-polymer of 60 parts sodium Amps, 32.5 parts by weight acrylamide and 7.5 parts by weight sodium acrylate, the addition of 1000 ppm dadmac again gave a dramatic improvement in viscosity retention.

EXAMPLE 3

To demonstrate the potential benefit of various inhibitors on polymers made from ethylenically unsaturated monomers and which are not contaminated with any acrylamide at all, a laboratory test was developed observing the viscosity changes from initially making up a 1% solution of the polymer in 15% aqueous hydrochloric acid followed by storing it for one hour at 200° C. The polymer for this laboratory test was a homopolymer of dimethyl aminoethyl (meth) acrylate (dmaema) quaternised with methyl chloride. The process was conducted for each inhibitor at a inhibitor dosage of 100 ppm and at a inhibitor dosage of 500 ppm. The polymer to which no inhibitor had been added underwent 63.5% viscosity degradation during the test. Thus any value higher than this is an improvement. The values in the presence of the various stabilisers are shown in table 1 below. Viscosity was measured as in Example 2.

| | % Viscosity Retained | |
|---|---|---|
| Degradation Inhibitor | 100 ppm | 500 ppm |
| Blank | 63.5% | 63.5% |
| Dadmac | 69.3% | 83.3% |
| Atmac | 75.6% | 79.8% |
| Allyl Sulphonate | 65.5% | 71.9% |
| Vinyl Sulphonate | | 78.6% |
| Maleic Anhydride | 76.3% | 71.8% |
| Amps (Sodium Salt) | 43.2% | 38.6% |
| Dmaema | 73.6% | 78.6% |
| Aptac | 74.9% | 91.4% |

-continued

| Degradation Inhibitor | % Viscosity Retained | |
|---|---|---|
| | 100 ppm | 500 ppm |
| Acrylic Acid | 79.2% | 75.2% |
| Acrylamide | 79.8% | 86.0% |
| Acrylic Pre-Polymer* | 67.0% | 65.9% |

*This is a pre-polymer according to the Example of European Application 89301075.

I claim:

1. A polymeric composition comprising a blend formed by mixing a preformed polymer of (meth)acrylamide and containing residual free (meth)acrylamide monomer with viscosity-degradation inhibitor, characterized in that the amount of free (meth)acrylamide monomer is below 0.1% by weight of the polymer and the $LD_{50}$ of the inhibitor is above 400 mg/kg in rats and the oral inhibitor is an ethylenically unsaturated monomer which in the composition does not undergo any substantial reaction with said polymer.

2. A composition according to claim 1 in which the inhibitor is selected from ethylenically unsaturated cationic monomers, allylic monomers, maleic acid or anhydride, fumaric acid or anhydride, vinyl sulphonate, and styrene phosphonate.

3. A composition according to claim 1 in which the inhibitor is an allylic monomer.

4. A composition according to claim 1 in which the inhibitor is diallyl dimethylammonium chloride.

5. A composition according to claim 1 in which the polymer of acrylamide has intrinsic viscosity above 4 dl/g and is selected from acrylamide homopolymer and copolymers of acrylamide with anionic or cationic ethylenically unsaturated groups.

6. A composition according to claim 1 in which the acrylamide polymer has intrinsic viscosity above 4 dl/g and is a copolymer with a monomer selected from dialkylaminoalkylmethacrylate, dialkylaminoalkyl(meth)acrylamide where the central alkylene groups contains at least 2 carbon atoms, and 2-acrylamido-2-methylpropanesulphonate.

7. A composition according to claim 1 in which the acrylamide polymer is a copolymer of acrylamide with dimethyl or diethyl aminoethylmethacrylate or dimethyl diethyl aminopropyl(meth)acrylamide.

8. A method of making a composition that comprises a blend of a viscosity-degradation inhibitor and a preformed polymer formed by polymerization of a water soluble ethylenically unsaturated monomer or monomer blend, characterized in that the inhibitor is an ethylenically unsaturated monomer which in the composition does not undergo any substantial reaction with said polymer and is added to the polymer either by imbibing an aqueous solution of the inhibitor into solid gel particles of the polymer before or after drying, or by mixing an aqueous solution of the inhibitor into a dispersion of the polymer in particulate form in a non-aqueous liquid.

9. A polymeric composition comprising a blend formed by mixing viscosity-degradation inhibitor with a preformed polymer formed from water soluble ethylenically unsaturated monomer or monomer blend characterized in that the inhibitor is an allylic monomer which in the composition does not undergo any substantial reaction with said polymer.

10. A polymeric composition comprising a blend formed by mixing viscosity-degradation inhibitor with a preformed polymer formed from water soluble ethylenically unsaturated monomer or monomer blend characterized in that the inhibitor is an ethylenically unsaturated monomer which in the composition does not undergo any substantial reaction with said polymer and the polymer is formed from monomers that consist essentially only of ethylenically unsaturated cationic or anionic monomers.

11. A method according to claim 8 in which the inhibitor is diallyl dimethylammonium chloride.

12. A method according to claim 8 in which the polymer is formed of monomers that comprise dialkylaminoalkylmethacrylates and dialkylaminoalkyl(meth)acrylamides wherein the central alkylene group contains at least 2 carbon atoms.

13. A composition according to claim 9 in which the inhibitor is diallyl dimethylammonium chloride.

14. A composition according to claim 9 in which the polymer is formed of monomers that comprise dialkylaminoalkylmethacrylates and dialkylaminoalkyl(meth)acrylamides wherein the central alkylene group contains at least 2 carbon atoms.

15. A composition according to claim 10 which the inhibitor is diallyl dimethylammonium chloride.

16. A composition according to claim 10 in which the polymer is formed of monomers that comprise dialkylaminoalkylmethacrylates and dialkylaminoalkyl(meth)acrylamides wherein the central alkylene group contains at least 2 carbon atoms.

17. A polymer composition according to claim 1 in which the amount of inhibitor is at least 0.05% by weight of the polymer.

18. A polymer composition according to claim 9 in which the amount of inhibitor is at least 0.05% by weight of the polymer.

19. A polymer composition according to claim 10 in which the amount of inhibitor is at least 0.05% by weight of the polymer.

20. A method according to claim 8 in which the amount of inhibitor is at least 0.05% by weight of the polymer.

21. A method according to claim 8 in which the inhibitor has an oral $LD_{50}$ above 400 mg/kg in rats.

22. A method according to claim 8 in which the inhibitor is an allylic monomer.

23. A polymeric composition according to claim 20 in which the inhibitor has an oral $LD_{50}$ above 400 mg/kg in rats.

24. A polymeric composition according to claim 10 in which the inhibitor is an allylic monomer.

* * * * *